(12) United States Patent
Banks, Jr. et al.

(10) Patent No.: US 11,161,555 B2
(45) Date of Patent: Nov. 2, 2021

(54) TAILGATE DEACTIVATION SYSTEM

(71) Applicant: Banks Morrison Innovations LLC, Clayton, NC (US)

(72) Inventors: James E. Banks, Jr., Clayton, NC (US); Michael A. Morrison, Clayton, NC (US)

(73) Assignee: Banks Morrison Innovations LLC, Clayton, NC (US)

( * ) Notice: Subject to any disclaimer, the term of this patent is extended or adjusted under 35 U.S.C. 154(b) by 0 days.

(21) Appl. No.: 16/816,441

(22) Filed: Mar. 12, 2020

(65) Prior Publication Data

US 2021/0070377 A1    Mar. 11, 2021

Related U.S. Application Data

(60) Provisional application No. 62/896,878, filed on Sep. 6, 2019, provisional application No. 62/935,231, filed on Nov. 14, 2019.

(51) Int. Cl.
*E05F 15/611* (2015.01)
*B62D 33/027* (2006.01)
*E05F 15/60* (2015.01)
*H01H 13/50* (2006.01)

(52) U.S. Cl.
CPC .......... *B62D 33/0273* (2013.01); *E05F 15/60* (2015.01); *H01H 13/50* (2013.01); *E05Y 2201/434* (2013.01); *E05Y 2400/60* (2013.01); *E05Y 2900/546* (2013.01); *H01H 2231/026* (2013.01)

(58) Field of Classification Search
CPC ......... E05Y 2201/434; E05Y 2900/546; E05Y 2400/60; H01H 13/50; H01H 2231/026; E05F 15/60; B62D 33/0273
See application file for complete search history.

(56) References Cited

U.S. PATENT DOCUMENTS

| | | |
|---|---|---|
| 3,710,370 A | 1/1973 | Quilici et al. |
| 5,159,312 A | 10/1992 | Engle |
| 6,095,589 A * | 8/2000 | Kinnanen .............. B60J 7/1265 296/107.09 |
| 6,980,096 B1 | 12/2005 | Washington et al. |
| 7,185,451 B2 | 3/2007 | Tsuchizaki |
| 7,293,821 B2 | 11/2007 | Tran |
| 9,283,994 B2 | 3/2016 | Holzberg et al. |
| 9,725,942 B2 | 8/2017 | Gunreben et al. |

(Continued)

FOREIGN PATENT DOCUMENTS

| | | |
|---|---|---|
| DE | 102009055778 A1 | 6/2011 |
| EP | 2033817 B1 | 3/2009 |

(Continued)

*Primary Examiner* — Jared Fureman
*Assistant Examiner* — Esayas G Yeshaw
(74) *Attorney, Agent, or Firm* — Withrow & Terranova, PLLC

(57) ABSTRACT

A tailgate deactivation system. A switch includes two terminals configured to be electrically coupled to a tailgate power circuit that supplies power to at least a portion of a tailgate of a vehicle, and an actuator configured to electrically couple the two terminals in an on state to allow power to flow in the tailgate power circuit, and to electrically decouple the two terminals in an off state to inhibit power from flowing in the tailgate power circuit.

19 Claims, 7 Drawing Sheets

(56) References Cited

U.S. PATENT DOCUMENTS

| | | | |
|---|---|---|---|
| 9,797,180 B2 | 10/2017 | Salmon et al. | |
| 10,059,161 B1 | 8/2018 | Salter et al. | |
| 10,103,488 B2 | 10/2018 | Ghannam et al. | |
| 10,220,839 B2 | 3/2019 | Lavoie | |
| 2002/0084675 A1 | 7/2002 | Buchanan et al. | |
| 2009/0079217 A1* | 3/2009 | Bakshi | B60P 1/435 |
| | | | 296/61 |
| 2015/0217685 A1* | 8/2015 | Salter | B60Q 3/30 |
| | | | 362/485 |
| 2017/0282979 A1* | 10/2017 | Singer | B60R 19/32 |
| 2019/0249479 A1 | 8/2019 | Lewis et al. | |
| 2020/0141171 A1* | 5/2020 | Ghannam | B60Q 1/50 |
| 2020/0148283 A1* | 5/2020 | Robinson | B62D 33/03 |
| 2020/0378170 A1* | 12/2020 | Kerr | E05F 15/622 |
| 2021/0025216 A1* | 1/2021 | Salter | B60J 7/1607 |

FOREIGN PATENT DOCUMENTS

| | | |
|---|---|---|
| EP | 1422366 B1 | 5/2014 |
| EP | 3219894 B1 | 9/2017 |

\* cited by examiner

TAILGATE DEACTIVATION SYSTEM

RELATED APPLICATIONS

This application claims the benefit of U.S. Provisional Application No. 62/896,878, filed on Sep. 6, 2019, entitled "TAILGATE DEACTIVATION SYSTEM," and U.S. Provisional Application No. 62/935,231, filed on Nov. 14, 2019, entitled "MANUAL TAILGATE DEACTIVATION SYSTEM," the disclosures of each of which are hereby incorporated herein by reference in their entireties.

BACKGROUND

Tailgates of vehicles that are capable of pivoting below the bed of the vehicle may impact towing apparatus, and damage the tailgate and/or the towing apparatus.

SUMMARY

The embodiments disclosed herein include a tailgate deactivation system that deactivates the inner gate panel of a multi-panel tailgate to inhibit movement of the inner gate panel with respect to the primary gate panel, and thus prevent the inner gate panel from being inadvertently pivoted downward into a towing apparatus that is coupled to the vehicle.

In a first embodiment a tailgate deactivation system is provided. The tailgate deactivation system includes a switch, which includes two terminals configured to be electrically coupled to a tailgate power circuit that supplies power to at least a portion of a tailgate of a vehicle, and an actuator configured to electrically couple the two terminals in an on state to allow power to flow in the tailgate power circuit, and to electrically decouple the two terminals in an off state to inhibit power from flowing in the tailgate power circuit.

In another embodiment, a tailgate deactivation system is provided which includes a switch, the switch including two terminals configured to be electrically coupled to a tailgate power circuit that supplies power to an inner gate panel of a multi-panel tailgate that includes a primary gate panel and the inner gate panel, and an actuator configured to electrically couple the two terminals in an on state to allow power to flow in the tailgate power circuit to facilitate movement of the inner gate panel with respect to the primary gate panel, and to electrically decouple the two terminals in an off state to inhibit power from flowing in the tailgate power circuit to inhibit movement of the inner gate panel with respect to the primary gate panel.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Certain vehicles, including pickup trucks, utilize multi-panel tailgates that include a primary gate panel and an inner gate panel, which allow operators to quickly configure the tailgate into any of several different tailgate configurations. In certain configurations, when the primary gate panel is positioned in a substantially horizontal plane (e.g., the tailgate is open), the inner gate panel is capable of pivoting below the horizontal plane to a nearly vertical plane. If a towing apparatus, such as a ball mount system, has been installed on the vehicle, the inner gate panel is capable of impacting the towing apparatus and damaging the inner gate panel.

The embodiments disclosed herein include a tailgate deactivation system that deactivates the inner gate panel of a multi-panel tailgate to inhibit movement of the inner gate panel with respect to the primary gate panel, and thus prevent the inner gate panel from being inadvertently pivoted downward into a towing apparatus that is coupled to the vehicle.

Figure 1:
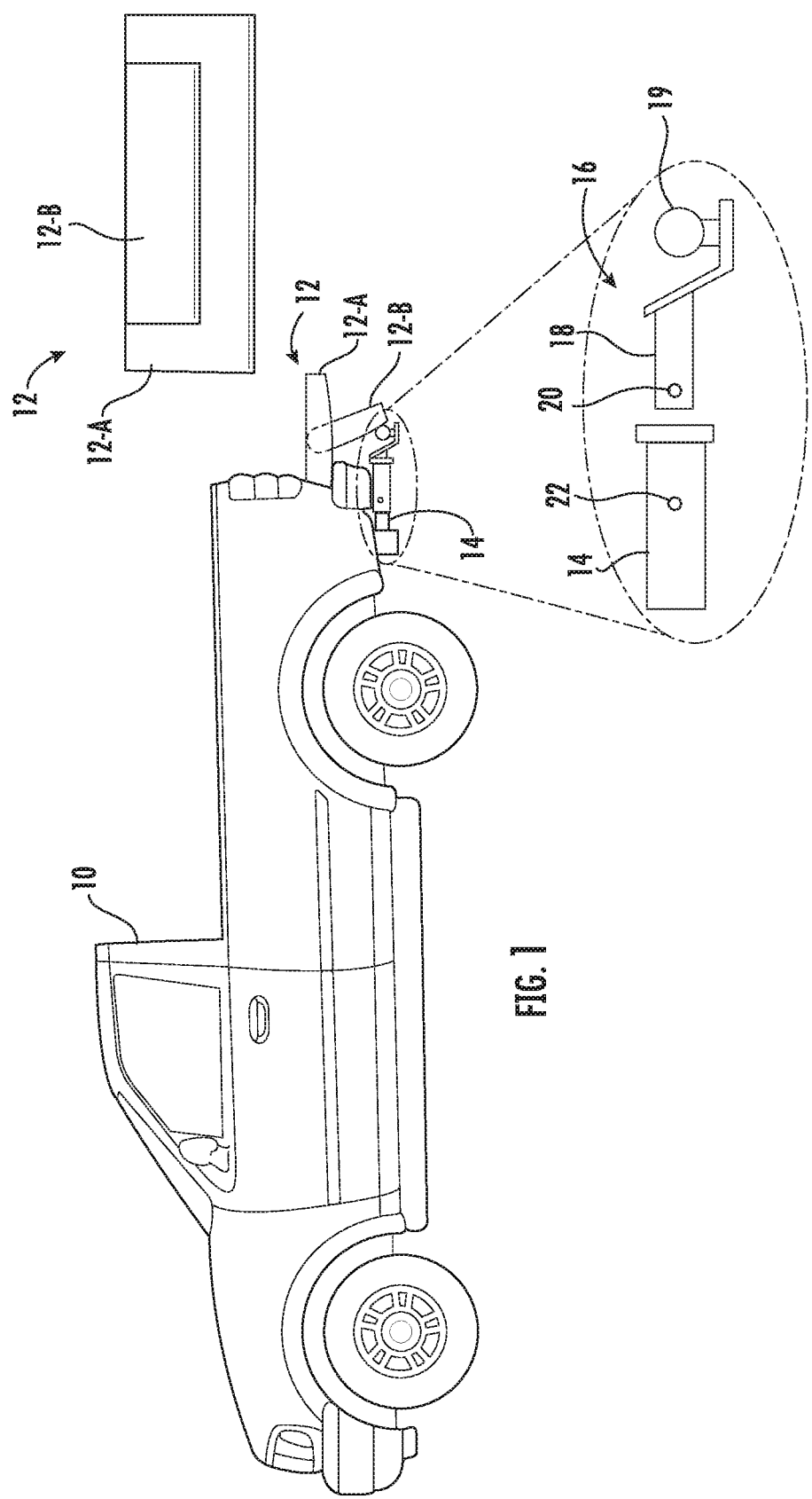
FIG. 1 is a schematic block diagram of a vehicle with a multi-panel tailgate.

FIG. 1 is a schematic block diagram of a vehicle 10 with a multi-panel tailgate 12. The multi-panel tailgate 12 includes a primary gate panel 12-A and an inner gate panel 12-B, each of which may open (i.e., pivot) independently of one another. While for purposes of illustration the multi-panel tailgate 12 has only two panels, the embodiments herein apply to multi-panel tailgates that have more than two panels. The vehicle 10 may comprise any vehicle having a multi-panel tailgate in which at least one panel of the multi-panel tailgate, when opened, is capable of pivoting below the bed of the vehicle 10. By way of non-limiting example, the multi-panel tailgate 12 may comprise a GMC® Sierra® brand pickup truck, such as Models 1500, 2500, and 3500, model years 2019, 2020, or the like, although the embodiments are not limited to any particular vehicle or to any particular multi-panel tailgate.

The vehicle 10 includes a hitch receiver tube 14. A ball mount system 16 is mounted within the hitch receiver tube 14. The ball mount system 16 includes a shaft 18 that has two opposing shaft openings 20 (only one shaft opening 20 seen in FIG. 1), and a trailer hitch ball 19. To couple the ball mount system 16 to the hitch receiver tube 14, the operator inserts the shaft 18 into the hitch receiver tube 14 until the shaft openings 20 align with two hitch pin openings 22 (only one hitch pin opening 22 seen in FIG. 1). A hitch pin (not illustrated) may then be installed into the hitch pin openings 22 and shaft openings 20 to lock the ball mount system 16 with respect to the hitch receiver tube 14. The embodiments disclosed herein prevent the inner gate panel 12-B of the multi-panel tailgate 12 from opening when a towing apparatus, such as the ball mount system 16, is coupled to the hitch receiver tube 14 to prevent the inner gate panel 12-B from impacting the ball mount system 16 and damaging the inner gate panel 12-B.

Figure 2:
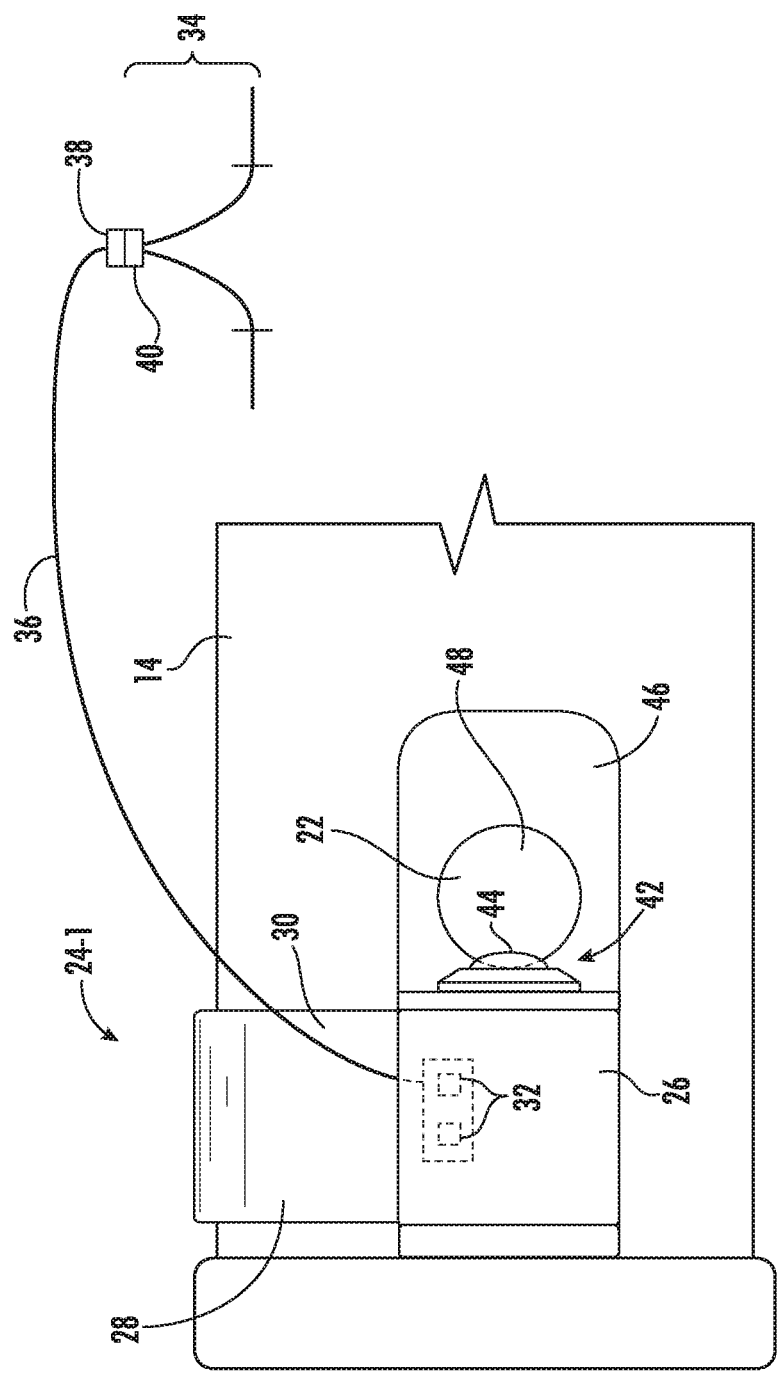
FIG. 2 illustrates a schematic of a tailgate deactivation system according to one embodiment.

FIG. 2 illustrates a schematic of a tailgate deactivation system 24-1 according to one embodiment. The tailgate deactivation system 24-1 includes a switch 26 coupled to a hitch receiver tube mount 28. The hitch receiver tube mount 28 is configured to fix the switch 26 to the hitch receiver tube 14 of the vehicle 10 (FIG. 1). In this embodiment, the hitch receiver tube mount 28 comprises an L-bracket 30 that includes an adhesive (on the underside of the L-bracket 30) for coupling the L-bracket 30 to the hitch receiver tube 14. In other embodiments, the hitch receiver tube mount 28 may comprise a band that completely encircles the hitch receiver tube 14, or may comprise any other mechanism suitable for fixing the switch 26 with respect to the hitch receiver tube 14, such as simply an adhesive strip, or the like. The L-bracket 30 may comprise any suitably rigid material, such as metal, plastic, or the like.

The switch 26 includes two terminals 32 configured to be electrically coupled to a tailgate power circuit 34 that supplies power to at least a portion of the multi-panel tailgate 12 (FIG. 1). The tailgate deactivation system 24-1 may include wires 36 coupled to the terminals 32 that terminate in a plug 38 that can be press-connected with a plug 40 of the tailgate power circuit 34. In other embodiments, where the tailgate power circuit 34 does not include a suitable plug, or where a plug is not desired, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

The switch 26 includes an actuator 42 configured to electrically couple the two terminals 32 in an on state to allow power to flow in the tailgate power circuit 34, and thereby facilitate movement of the inner gate panel 12-B with respect to the primary gate panel 12-A. In an off state, the actuator 42 decouples the two terminals 32 to inhibit power from flowing in the tailgate power circuit 34 and to inhibit movement of the inner gate panel 12-B with respect to the primary gate panel 12-A.

The actuator 42 comprises an actuation surface 44 that is configured to cause the switch 26 to transition from the on state to the off state by the coupling of the ball mount system 16 to the hitch receiver tube 14. Thus, an operator need only perform their normal process for coupling the ball mount system 16 to the hitch receiver tube 14 to transition the switch 26 to the off state, and thereby disable the ability for the inner gate panel 12-B to pivot below the primary gate panel 12-A and accidentally contact the ball mount system 16.

The actuation surface 44, in this embodiment, is configured to transition the switch 26 from the on state to the off state in response to a hitch pin (sometimes referred to as a lock pin) being inserted through the hitch pin openings 22 of the hitch receiver tube 14 as the ball mount system 16 is coupled to the hitch receiver tube 14. As illustrated, the hitch receiver tube mount 28 is positioned on the hitch receiver tube 14 to couple the actuation surface 44 with respect to the hitch pin opening 22, such that installation of a hitch pin during the process of coupling the ball mount system 16 to the hitch receiver tube 14 causes the switch 26 to be placed in the off state.

In this particular embodiment, the actuation surface 44 is placed in a path of a shaft portion of a hitch pin, so that installation of the hitch pin causes the shaft portion of the hitch pin to contact the actuation surface 44. In this embodiment, the tailgate deactivation system 24-1 includes a tab 46 that forms an opening 48, which can be positioned during installation to be co-linear with one of the hitch pin openings 22 of the hitch receiver tube 14 to facilitate positioning the actuation surface 44 and the hitch receiver tube mount 28 at a proper location with respect to the hitch pin opening 22. It will be apparent that the actuation surface 44 could be located at other locations on the hitch receiver tube 14 to cause the switch 26 to be activated during the coupling of the ball mount system 16 to the hitch receiver tube 14. It will also be apparent that the actuation surface 44 could be activated by the installation of a hitch pin even if not located to be co-linear with the hitch pin openings 22 depending on the shape and configuration of the hitch pin. For example, the actuation surface 44 may be placed at a location to be contacted by a stop collar of a hitch pin, or placed at a location where a hitch pin accessory, such as a hitch pin lock, makes contact with the actuation surface 44. It will also be appreciated that the switch 26 may comprise any suitable type of switch, such as a proximity switch or the like, that can be activated by the coupling of the ball mount system 16 to the hitch receiver tube 14.

Figure 3C:
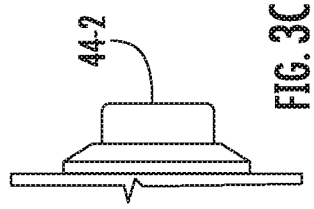
FIGS. 3A-3C illustrate various example actuation surfaces according to different embodiments.
Figure 3B:
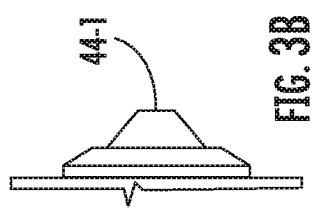
Figure 3A:
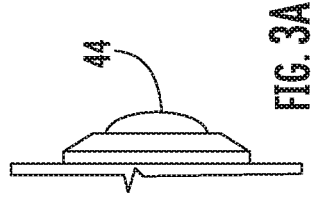

FIGS. 3A-3C illustrate various example actuation surfaces 44, 44-1, 44-2 that may be suitable for actuating the switch 26 during installation of a hitch pin, according to different embodiments.

Figure 4:
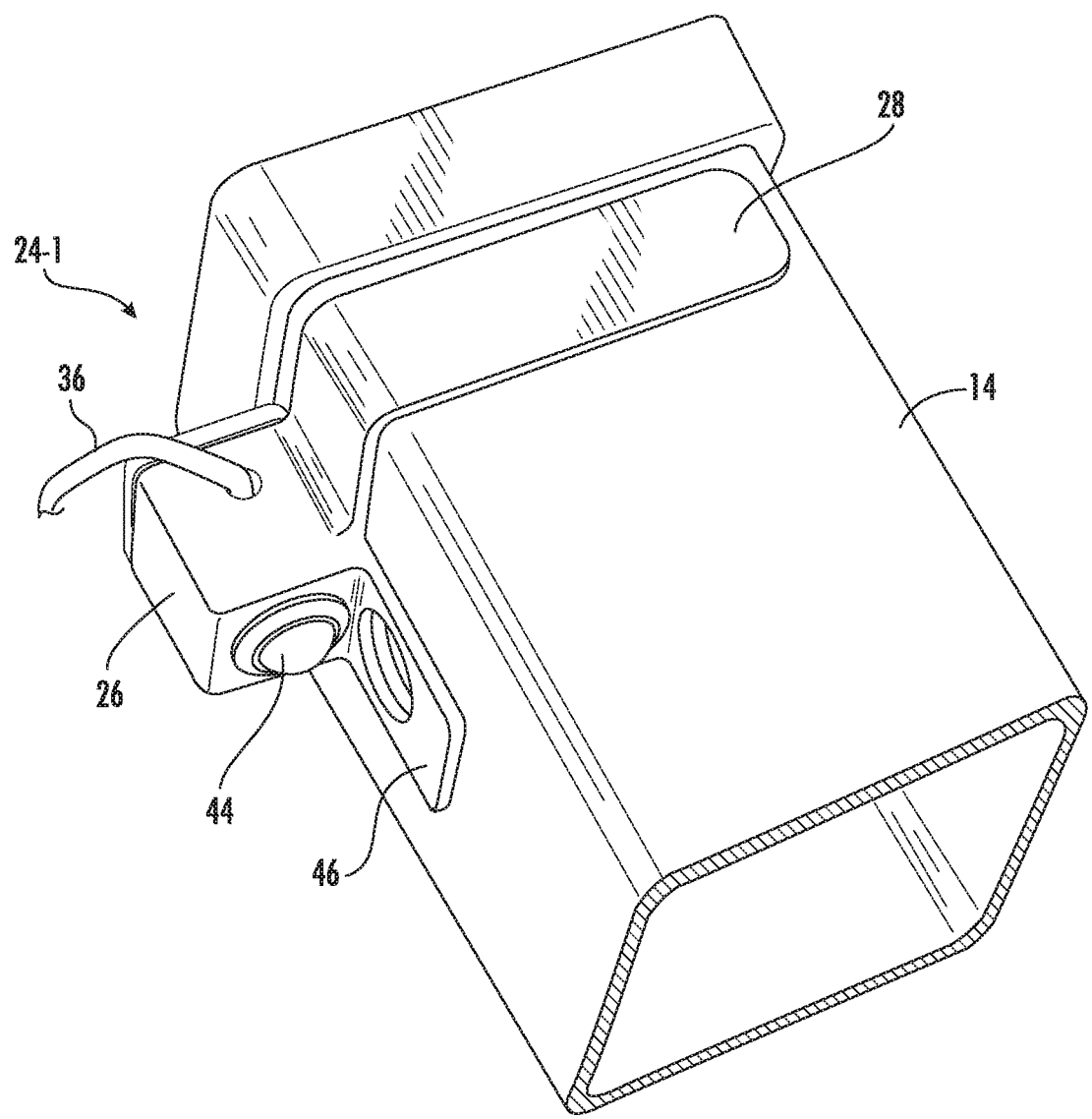
FIG. 4 is a perspective view of the tailgate deactivation system illustrated in FIG. 2.

FIG. 4 is a perspective view of the tailgate deactivation system 24-1 coupled to the hitch receiver tube 14 according to one embodiment.

Figure 5:
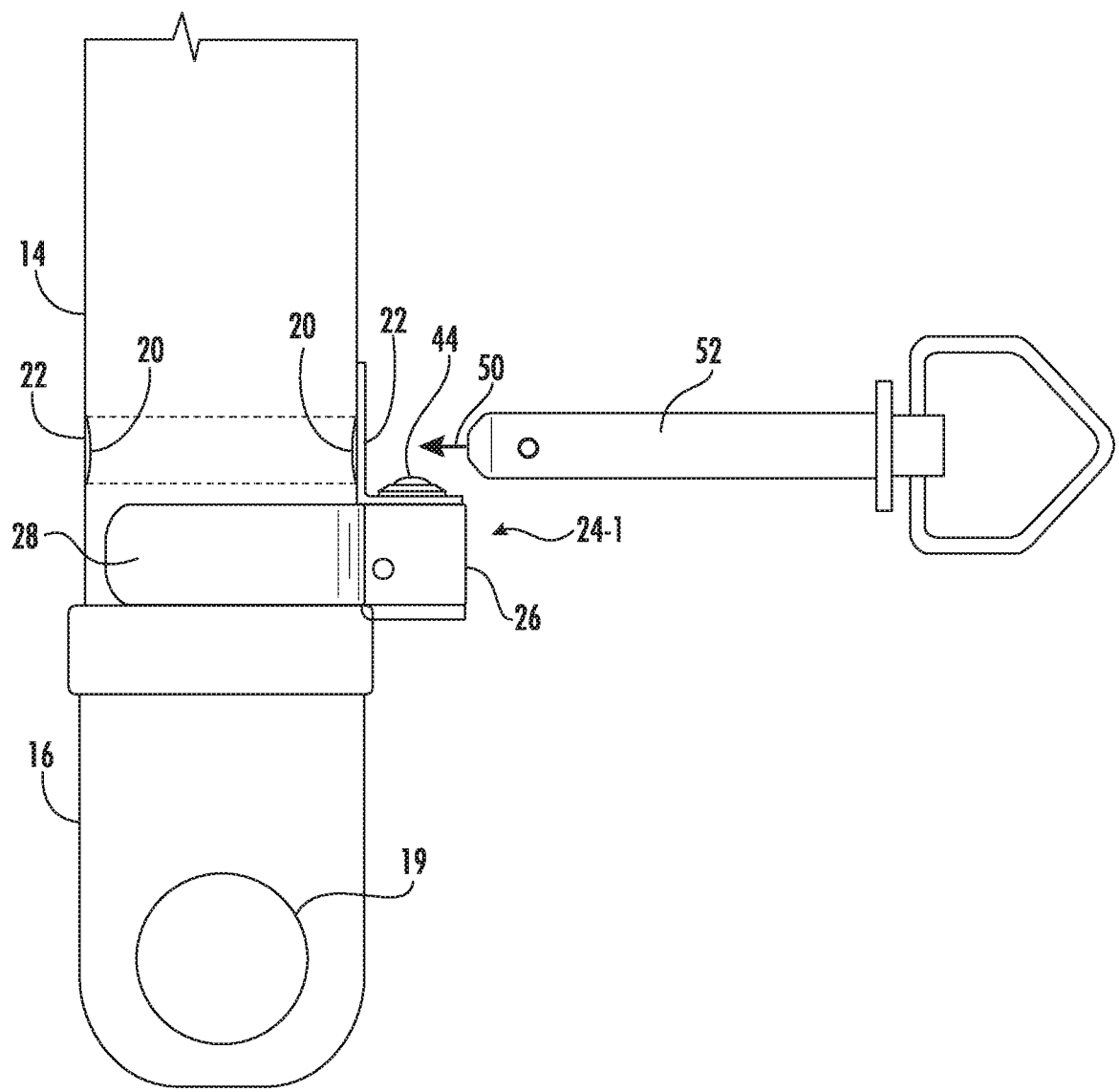
FIG. 5 illustrates a schematic of a hitch pin installation according to one embodiment.

FIG. 5 is a schematic illustrating a hitch pin installation according to one embodiment. In this embodiment, the tailgate deactivation system 24-1 is configured such that the actuation surface 44 is placed in a path 50 of a hitch pin 52 during installation of the hitch pin 52 in the hitch pin openings 22 of the hitch receiver tube 14 and the shaft openings 20 of the shaft 18 of the ball mount system 16. As the hitch pin 52 is installed, a portion of the hitch pin 52, in this example a shaft portion of the hitch pin 52, contacts the actuation surface 44 and thereby causes the switch 26 to be placed into the off state, thereby inhibiting power from flowing to the tailgate power circuit 34 of the multi-panel tailgate 12. It will be apparent that, in this embodiment, the hitch pin 52 may also be inserted into the hitch pin openings 22 from the opposite direction of that shown in FIG. 5 to thereby contact the actuation surface 44.

Figure 6:
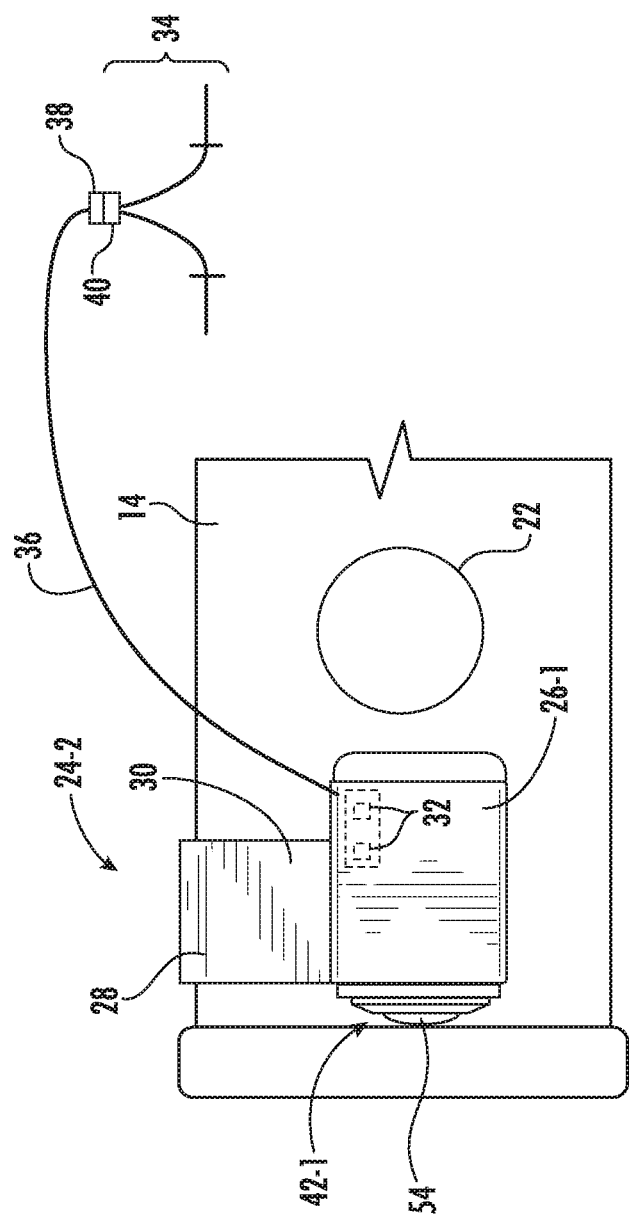
FIG. 6 illustrates a schematic of a tailgate deactivation system according to another embodiment.

FIG. 6 illustrates a schematic of a tailgate deactivation system 24-2 according to another embodiment. The tailgate deactivation system 24-2 is substantially similar to the tailgate deactivation system 24-1, except as otherwise discussed herein. The tailgate deactivation system 24-2 includes the hitch receiver tube mount 28 which is configured to fix a switch 26-1 to the hitch receiver tube 14 of the vehicle 10 (FIG. 1). In this embodiment, the hitch receiver tube mount 28 comprises the L-bracket 30 that includes an adhesive (on the underside of the L-bracket) for coupling the L-bracket 30 to the hitch receiver tube 14. In other embodiments, the hitch receiver tube mount 28 may comprise a band that completely encircles the hitch receiver tube 14, or any other mechanism suitable to fixing the switch 26-1 with respect to the hitch receiver tube 14, such as simply an adhesive strip, or the like.

The switch 26-1 includes the two terminals 32 configured to be electrically coupled to the tailgate power circuit 34 that supplies power to at least a portion of the multi-panel tailgate 12 (FIG. 1). The tailgate deactivation system 24-2 may include the wires 36 coupled to the terminals 32 that terminate in the plug 38 that can be press-connected with the plug 40 of the tailgate power circuit 34. In other embodiments, where the tailgate power circuit 34 does not include a suitable plug, the wires 36 may be electrically connected to corresponding wires of the tailgate power circuit 34 via any suitable mechanism, such as soldering, twist-on wire connectors, or the like. In some embodiments, where only the inner gate panel 12-B is capable of impacting the ball mount system 16 (FIG. 1), the tailgate power circuit 34 supplies power to the inner gate panel 12-B.

The switch 26-1 includes an actuator 42-1 configured to, in an on state, electrically couple the two terminals 32 to allow power to flow in the tailgate power circuit 34, and thereby facilitate movement of the inner gate panel 12-B with respect to the primary gate panel 12-A. In an off state, the actuator 42-1 decouples the two terminals 32 to inhibit power from flowing in the tailgate power circuit 34, and thereby inhibit movement of the inner gate panel 12-B with respect to the primary gate panel 12-A. In this embodiment, the actuator 42-1 is configured to be actuated by the exertion of physical force by an operator or other individual against the actuator 42-1 to manually depress the actuator 42-1. In this example, the actuator 42-1 includes an actuation surface in the form of a manual push-button 54, and the operator urges the manual push-button 54 to cause the switch 26-1 to be in the on state to allow power to flow in the tailgate power circuit 34. Pressing the manual push-button 54 a second time causes the switch 26-1 to be in the off state to inhibit power from flowing in the tailgate power circuit 34. Note that the L-bracket 30, in this example, positions the push-button 54 to face in a direction behind the vehicle.

Figure 7:
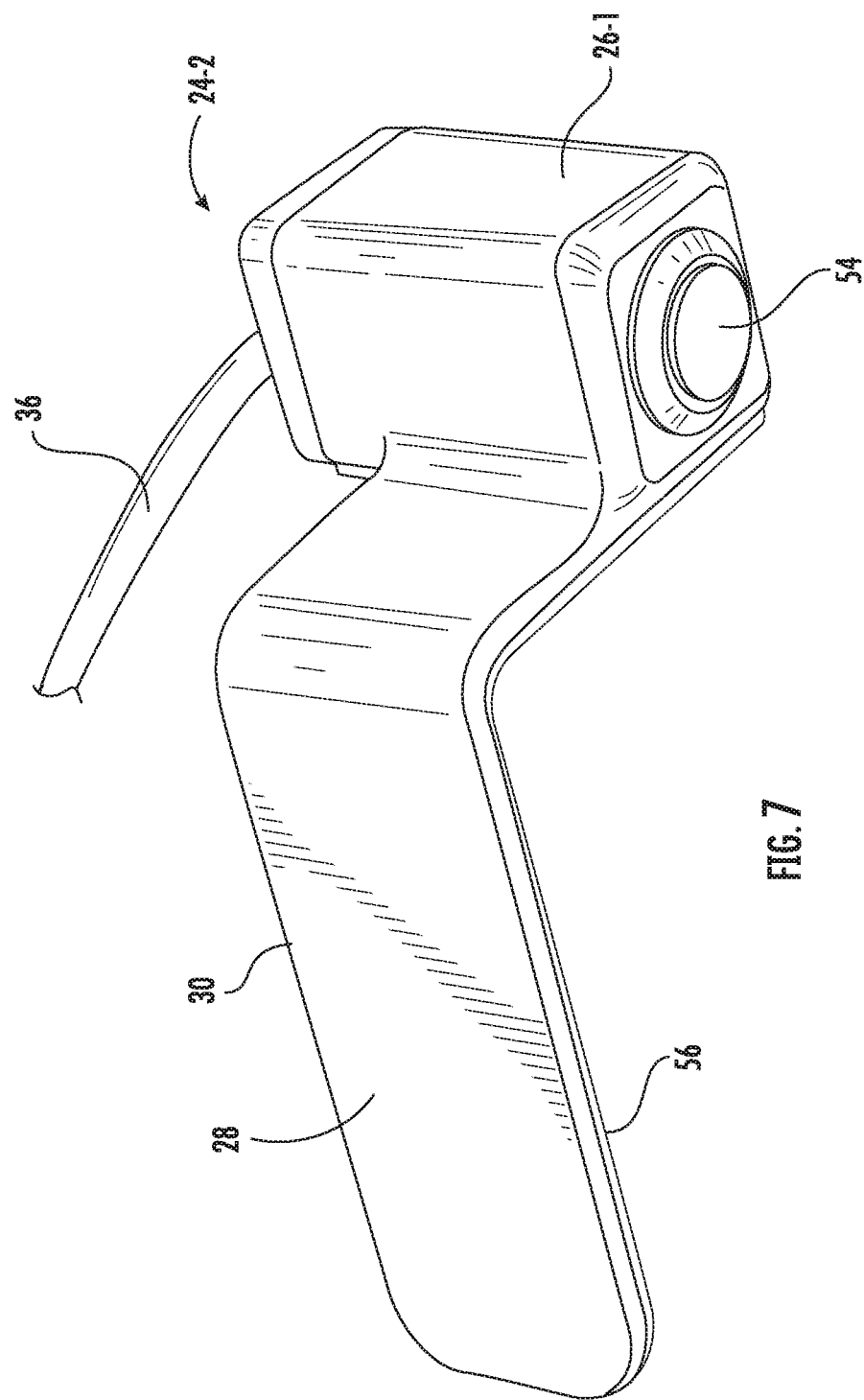
FIG. 7 is a perspective view of the tailgate deactivation system illustrated in FIG. 6.

FIG. 7 is a perspective view of the tailgate deactivation system 24-2 illustrated in FIG. 6. The tailgate deactivation system 24-2 may include an adhesive strip 56 coupled to the underside of the L-bracket 30 to facilitate attachment of the L-bracket 30 to the hitch receiver tube 14.

Figure 8:
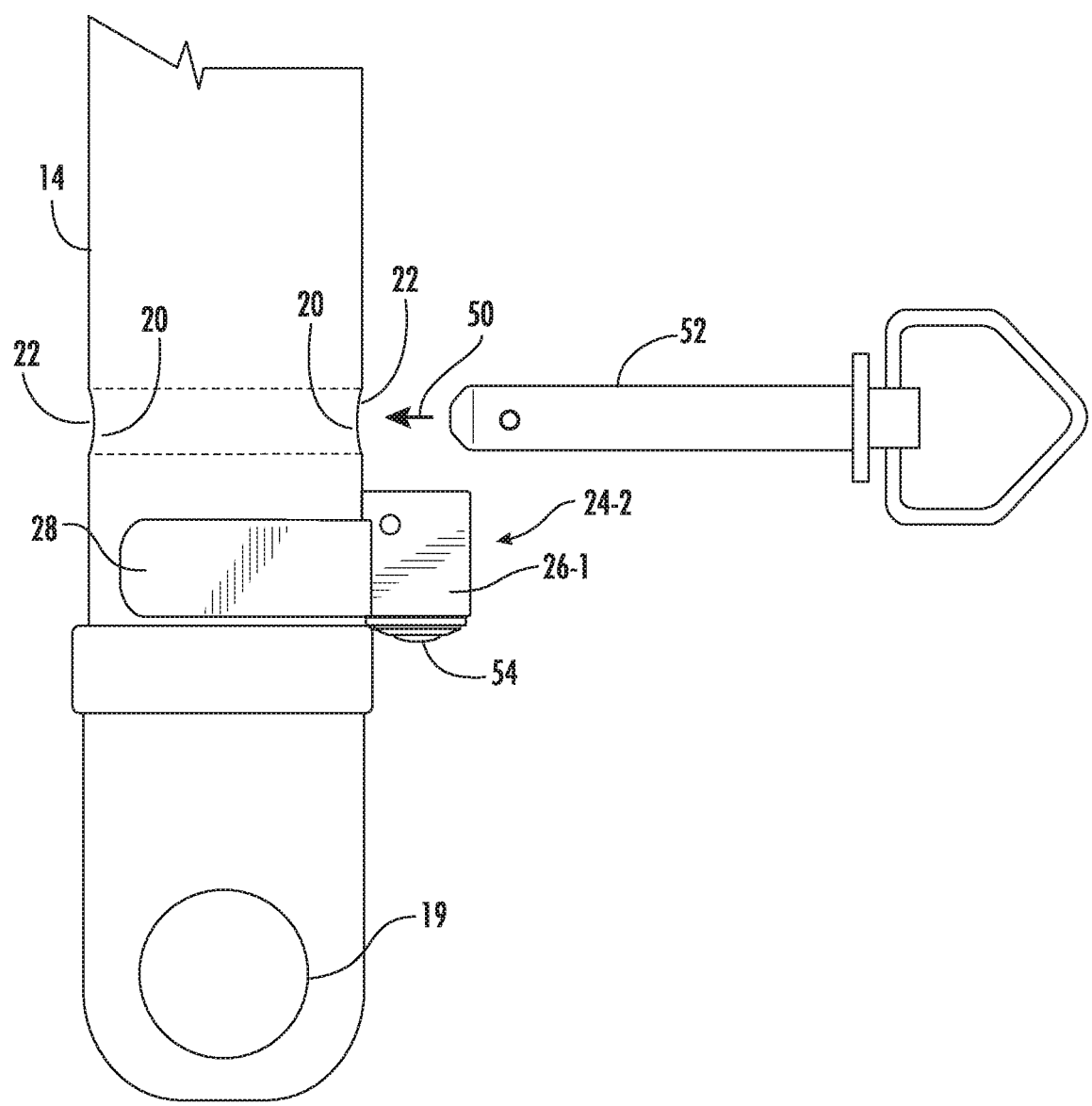
FIG. 8 illustrates a schematic of a hitch pin installation according to another embodiment.

FIG. 8 illustrates a schematic of a hitch pin installation according to another embodiment. In this embodiment, the tailgate deactivation system 24-2 is configured such that the push-button 54 faces a direction behind the vehicle to facilitate easy actuation by an operator.

Those skilled in the art will recognize improvements and modifications to the preferred embodiments of the disclosure. All such improvements and modifications are considered within the scope of the concepts disclosed herein and the claims that follow.

What is claimed is:

1. A tailgate deactivation system comprising:
   a switch comprising:
      two terminals configured to be electrically coupled to a tailgate power circuit that supplies power to at least a portion of a tailgate of a vehicle; and
      an actuator comprising an actuation surface, wherein the actuator is configured to electrically couple the two terminals in an on state to allow power to flow in the tailgate power circuit, and to electrically decouple the two terminals in an off state to inhibit power from flowing in the tailgate power circuit, and wherein the actuation surface is configured to transition the switch from the on state to the off state in response to a hitch pin being installed into a hitch pin opening of a hitch receiver tube of the vehicle.

2. The tailgate deactivation system of claim 1 further comprising:
   a hitch receiver tube mount coupled to the switch, the hitch receiver tube mount being configured to be mounted to the hitch receiver tube of the vehicle.

3. The tailgate deactivation system of claim 2 wherein the hitch receiver tube mount is configured to be coupled to the hitch receiver tube at a location on the hitch receiver tube to place the actuator in a path of the hitch pin used to couple a towing apparatus to the hitch receiver tube.

4. The tailgate deactivation system of claim 2 wherein the hitch receiver tube mount comprises an adhesive.

5. The tailgate deactivation system of claim 2 wherein the hitch receiver tube mount comprises a bracket.

6. The tailgate deactivation system of claim 2 wherein the hitch receiver tube mount is configured to couple the actuation surface with respect to the hitch pin opening of the hitch receiver tube, such that installation of the hitch pin to couple a towing apparatus to the hitch receiver tube causes the switch to be placed into the off state.

7. The tailgate deactivation system of claim 1 wherein the tailgate power circuit that supplies power to at least the portion of the tailgate of the vehicle controls power to an inner gate panel of the tailgate.

8. The tailgate deactivation system of claim 1 wherein the tailgate power circuit supplies power to an inner gate panel of a multi-panel tailgate that comprises a primary gate panel and the inner gate panel, and wherein the actuator is configured to decouple the two terminals in the off state to prevent the inner gate panel from pivoting with respect to the primary gate panel and thereby drop below a plane in which the primary gate panel and the inner gate panel are located.

9. A tailgate deactivation system comprising:
   a switch comprising:
      two terminals configured to be electrically coupled to a tailgate power circuit that supplies power to an inner gate panel of a multi-panel tailgate that includes a primary gate panel and the inner gate panel; and
      an actuator comprising an actuation surface, wherein the actuator is configured to electrically couple the two terminals in an on state to allow power to flow in the tailgate power circuit to facilitate movement of the inner gate panel with respect to the primary gate panel, and to electrically decouple the two terminals in an off state to inhibit power from flowing in the tailgate power circuit to inhibit movement of the inner gate panel with respect to the primary gate panel, and wherein the actuation surface is configured to transition the switch from the on state to the off state in response to a hitch pin being installed into a hitch pin opening of a hitch receiver tube of the vehicle.

10. A tailgate deactivation system comprising:
a switch comprising:
   two terminals configured to be electrically coupled to a tailgate power circuit that supplies power to at least a portion of a tailgate of a vehicle; and
   an actuator configured to electrically couple the two terminals in an on state to allow power to flow in the tailgate power circuit, and to electrically decouple the two terminals in an off state to inhibit power from flowing in the tailgate power circuit; and
a hitch receiver tube mount coupled to the switch, the hitch receiver tube mount being configured to be mounted to a hitch receiver tube of the vehicle and to be coupled to the hitch receiver tube at a location on the hitch receiver tube to place the actuator in a path of a hitch pin used to couple a towing apparatus to the hitch receiver tube.

11. A tailgate deactivation system comprising:
a switch comprising:
   two terminals configured to be electrically coupled to a tailgate power circuit that supplies power to at least a portion of a tailgate of a vehicle; and
   an actuator configured to electrically couple the two terminals in an on state to allow power to flow in the tailgate power circuit, and to electrically decouple the two terminals in an off state to inhibit power from flowing in the tailgate power circuit; and
a hitch receiver tube mount coupled to the switch, the hitch receiver tube mount comprising an adhesive configured to be mounted to a hitch receiver tube of the vehicle.

12. A tailgate deactivation system comprising:
a switch comprising:
   two terminals configured to be electrically coupled to a tailgate power circuit that supplies power to at least a portion of a tailgate of a vehicle; and
   an actuator configured to electrically couple the two terminals in an on state to allow power to flow in the tailgate power circuit, and to electrically decouple the two terminals in an off state to inhibit power from flowing in the tailgate power circuit; and
a hitch receiver tube mount coupled to the switch, the hitch receiver tube mount comprising a bracket configured to be mounted to a hitch receiver tube of the vehicle.

13. A tailgate deactivation system comprising:
a switch comprising:
   two terminals configured to be electrically coupled to a tailgate power circuit that supplies power to at least a portion of a tailgate of a vehicle; and
   an actuator comprising an actuation surface, the actuator being configured to electrically couple the two terminals in an on state to allow power to flow in the tailgate power circuit, and to electrically decouple the two terminals in an off state to inhibit power from flowing in the tailgate power circuit; and
a hitch receiver tube mount coupled to the switch, wherein the hitch receiver tube mount is configured to be mounted to a hitch receiver tube of the vehicle, and wherein the hitch receiver tube mount is further configured to couple the actuation surface with respect to a hitch pin opening of the hitch receiver tube, such that installation of the hitch pin to couple the towing apparatus to the hitch receiver tube causes the switch to be placed into the off state.

14. A tailgate deactivation system comprising:
a switch comprising:
   two terminals configured to be electrically coupled to a tailgate power circuit that supplies power to at least a portion of a tailgate of a vehicle; and
   an actuator comprising a push-button configured to be manually activated or deactivated and further configured to electrically couple the two terminals in an on state to allow power to flow in the tailgate power circuit, and to electrically decouple the two terminals in an off state to inhibit power from flowing in the tailgate power circuit.

15. A tailgate deactivation system comprising:
a switch comprising:
   two terminals configured to be electrically coupled to a tailgate power circuit that supplies power to at least a portion of a tailgate of a vehicle; and
   an actuator comprising an actuation surface, wherein the actuator is configured to electrically couple the two terminals in an on state to allow power to flow in the tailgate power circuit, and to electrically decouple the two terminals in an off state to inhibit power from flowing in the tailgate power circuit, and wherein the actuation surface is configured to transition the switch from the on state to the off state by coupling a ball mount system to a hitch receiver tube of the vehicle.

16. A tailgate deactivation system comprising:
a switch comprising:
   two terminals configured to be electrically coupled to a tailgate power circuit that supplies power to at least a portion of a tailgate of a vehicle; and
   an actuator comprising a push-button configured to electrically couple the two terminals in an on state to allow power to flow in the tailgate power circuit, and to electrically decouple the two terminals in an off state to inhibit power from flowing in the tailgate power circuit, wherein installation of a hitch pin of a ball mount system urges the push-button to cause the switch to be placed into the off state.

17. A tailgate deactivation system comprising:
a switch comprising:
   two terminals configured to be electrically coupled to a tailgate power circuit that supplies power to at least a portion of a tailgate of a vehicle and that controls power to an inner gate panel of the tailgate; and
   an actuator configured to electrically couple the two terminals in an on state to allow power to flow in the tailgate power circuit, and to electrically decouple the two terminals in an off state to inhibit power from flowing in the tailgate power circuit.

18. A tailgate deactivation system comprising:
a switch comprising:
   two terminals configured to be electrically coupled to a tailgate power circuit that supplies power to an inner gate panel of a multi-panel tailgate of a vehicle, the multi-panel tailgate comprising a primary gate panel and the inner gate panel; and
   an actuator configured to electrically couple the two terminals in an on state to allow power to flow in the tailgate power circuit, and to electrically decouple the two terminals in an off state to inhibit power from flowing in the tailgate power circuit and to prevent the inner gate panel from pivoting with respect to the primary gate panel and thereby drop below a plane in which the primary gate panel and the inner gate panel are located.

19. A tailgate deactivation system comprising:

a switch comprising:

two terminals configured to be electrically coupled to a tailgate power circuit that supplies power to an inner gate panel of a multi-panel tailgate that includes a primary gate panel and the inner gate panel; and an actuator comprising an actuation surface, wherein the actuator is configured to electrically couple the two terminals in an on state to allow power to flow in the tailgate power circuit to facilitate movement of the inner gate panel with respect to the primary gate panel, and to electrically decouple the two terminals in an off state to inhibit power from flowing in the tailgate power circuit to inhibit movement of the inner gate panel with respect to the primary gate panel, and wherein the actuation surface is configured to transition the switch from the on state to the off state by coupling a ball mount system to a hitch receiver tube of the vehicle.

* * * * *